(12) United States Patent
Chen

(10) Patent No.: US 10,325,088 B2
(45) Date of Patent: Jun. 18, 2019

(54) METHOD AND SYSTEM FOR INFORMATION AUTHENTICATION

(71) Applicant: Alibaba Group Holding Limited, George Town, Grand Cayman (KY)

(72) Inventor: Jinsai Chen, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 0 days.

(21) Appl. No.: 14/730,111

(22) Filed: Jun. 3, 2015

(65) Prior Publication Data

US 2016/0004857 A1    Jan. 7, 2016

(30) Foreign Application Priority Data

Jul. 3, 2014    (CN) .......................... 2014 1 0315285

(51) Int. Cl.
| | |
|---|---|
| *H04L 29/06* | (2006.01) |
| *G06F 21/40* | (2013.01) |
| *G06Q 20/40* | (2012.01) |
| *H04W 12/06* | (2009.01) |
| *H04W 12/08* | (2009.01) |
| *H04W 12/12* | (2009.01) |

(52) U.S. Cl.
CPC .............. *G06F 21/40* (2013.01); *G06Q 20/40* (2013.01); *H04L 63/10* (2013.01); *H04W 12/06* (2013.01); *H04W 12/08* (2013.01); *H04W 12/12* (2013.01)

(58) Field of Classification Search
CPC ....................................................... G06F 21/40
USPC ............................................................ 726/3
See application file for complete search history.

(56) References Cited

U.S. PATENT DOCUMENTS

| | | | |
|---|---|---|---|
| 4,281,391 | A | 7/1981 | Huang |
| 6,526,166 | B1 | 2/2003 | Gorman |
| 6,697,947 | B1 | 2/2004 | Matyas, Jr. |
| 6,726,094 | B1 | 4/2004 | Rantze |
| 7,149,720 | B2 | 12/2006 | Shepherd |
| 7,321,874 | B2 | 1/2008 | Dilip |
| 7,734,527 | B2 | 6/2010 | Uzo |
| 7,809,636 | B1 | 10/2010 | Jou |
| 7,809,762 | B1 | 10/2010 | Parker |
| 7,877,297 | B2 * | 1/2011 | Gould .................. G06Q 20/40 705/26.1 |
| 7,941,760 | B2 | 5/2011 | Kocienda |
| 7,946,474 | B1 | 5/2011 | Agrawal |
| 7,978,900 | B2 | 7/2011 | Nepomniachtchi |
| 8,090,642 | B1 | 1/2012 | Van Doren |

(Continued)

FOREIGN PATENT DOCUMENTS

| | | |
|---|---|---|
| CN | 201498035 | 6/2010 |
| DE | 102004047258 | 4/2006 |

(Continued)

*Primary Examiner* — Harris C Wang
(74) *Attorney, Agent, or Firm* — Shun Yao; Park, Vaughan, Fleming & Dowler LLP

(57) ABSTRACT

A system is provided for facilitating multi-party authentication. During operation, the system receives, via a communication module, an operation request from a primary user. The system then sends an authentication request to the authentication assistance user and receives a response from the authentication assistance user. Subsequently, the system allows or denies the operation request based on the response received from the authentication assistance user.

22 Claims, 4 Drawing Sheets

(56) References Cited

U.S. PATENT DOCUMENTS

| | | | |
|---|---|---|---|
| 8,176,324 B1 | 5/2012 | Krishnamurthy | |
| 8,280,782 B1 | 10/2012 | Talreja | |
| 8,423,392 B2 | 4/2013 | Moxley | |
| 8,423,467 B1 | 4/2013 | Johansson | |
| 8,645,295 B1 | 2/2014 | Dillard | |
| 9,111,073 B1 | 8/2015 | Jiang | |
| 9,239,722 B1* | 1/2016 | Calahan | G06F 9/44 |
| 9,621,348 B2 | 4/2017 | Bahjat | |
| 2002/0111916 A1* | 8/2002 | Coronna | G06Q 20/00 |
| | | | 705/64 |
| 2002/0156687 A1* | 10/2002 | Carr | G06Q 10/10 |
| | | | 705/27.1 |
| 2002/0161466 A1 | 10/2002 | Heching | |
| 2003/0042301 A1 | 3/2003 | Rajasekaran | |
| 2003/0061172 A1 | 3/2003 | Robinson | |
| 2003/0200190 A1 | 10/2003 | Adar | |
| 2004/0139008 A1 | 7/2004 | Mascavage | |
| 2004/0153407 A1 | 8/2004 | Clubb | |
| 2005/0038707 A1 | 2/2005 | Roever | |
| 2005/0071637 A1 | 3/2005 | Shirakawa | |
| 2005/0075954 A1 | 4/2005 | Matsumoto | |
| 2005/0113123 A1 | 5/2005 | Torvinen | |
| 2005/0144406 A1 | 6/2005 | Chong, Jr. | |
| 2005/0170856 A1 | 8/2005 | Keyani | |
| 2005/0240935 A1 | 10/2005 | Ramanathan | |
| 2006/0010190 A1 | 1/2006 | Shimbo | |
| 2006/0056626 A1 | 3/2006 | Keohane | |
| 2006/0069635 A1 | 3/2006 | Ram | |
| 2006/0089897 A1 | 4/2006 | Maas | |
| 2006/0176847 A1 | 8/2006 | Chen | |
| 2006/0220842 A1 | 10/2006 | Breed | |
| 2006/0271783 A1 | 11/2006 | Wong | |
| 2007/0035617 A1 | 2/2007 | Ko | |
| 2007/0043651 A1 | 2/2007 | Xiao | |
| 2007/0276730 A1 | 11/2007 | Lee | |
| 2008/0004981 A1 | 1/2008 | Gopalpur | |
| 2008/0077542 A1 | 3/2008 | McElhiney | |
| 2008/0097805 A1 | 4/2008 | Wells | |
| 2008/0119160 A1 | 5/2008 | Andriantsiferana | |
| 2008/0120160 A1 | 5/2008 | Woo | |
| 2008/0182586 A1 | 7/2008 | Aaron | |
| 2008/0228595 A1 | 9/2008 | Hill | |
| 2008/0306839 A1 | 12/2008 | Starrs | |
| 2009/0076926 A1 | 3/2009 | Zinberg | |
| 2009/0090772 A1 | 4/2009 | Lee | |
| 2009/0094275 A1* | 4/2009 | Patton | G06Q 10/10 |
| 2009/0106825 A1 | 4/2009 | Cerruti | |
| 2009/0144451 A1 | 6/2009 | Cabezas | |
| 2009/0157522 A1 | 6/2009 | Srinivasan | |
| 2009/0195506 A1 | 8/2009 | Geidl | |
| 2010/0042600 A1* | 2/2010 | Orr | G06Q 10/0631 |
| | | | 705/7.12 |
| 2010/0060585 A1 | 3/2010 | Chiu | |
| 2010/0073302 A1 | 3/2010 | Ritzau | |
| 2010/0088026 A1 | 4/2010 | Manolescu | |
| 2010/0162036 A1 | 6/2010 | Linden | |
| 2010/0191648 A1 | 7/2010 | Smith | |
| 2010/0210240 A1 | 8/2010 | Mahaffey | |
| 2010/0223543 A1 | 9/2010 | Marston | |
| 2010/0235283 A1 | 9/2010 | Gerson | |
| 2010/0241575 A1 | 9/2010 | Cotton | |
| 2010/0250436 A1 | 9/2010 | Loevenguth | |
| 2011/0016520 A1 | 1/2011 | Cohen | |
| 2011/0093493 A1 | 4/2011 | Nair | |
| 2011/0125616 A1 | 5/2011 | Ni | |
| 2011/0125667 A1* | 5/2011 | Faludi | G06F 8/10 |
| | | | 705/348 |
| 2011/0184840 A1 | 7/2011 | Godard | |
| 2011/0231465 A1 | 9/2011 | Phatak | |
| 2011/0258027 A1 | 10/2011 | Lee | |
| 2011/0264598 A1 | 10/2011 | Fuxman | |
| 2012/0016799 A1 | 1/2012 | Killian | |
| 2012/0076283 A1 | 3/2012 | Ajmera | |
| 2012/0101942 A1 | 4/2012 | Park | |
| 2012/0117271 A1 | 5/2012 | Kennedy | |
| 2012/0143924 A1 | 6/2012 | Sethi | |
| 2012/0158467 A1 | 6/2012 | Hammad | |
| 2012/0198228 A1* | 8/2012 | Oberheide | H04L 63/062 |
| | | | 713/155 |
| 2012/0204256 A1 | 8/2012 | Craine | |
| 2012/0259774 A1 | 10/2012 | Marti | |
| 2012/0259783 A1* | 10/2012 | Kemper | G06Q 20/04 |
| | | | 705/44 |
| 2012/0284776 A1* | 11/2012 | Sundaram | G06F 21/6218 |
| | | | 726/4 |
| 2012/0299831 A1 | 11/2012 | Lioy | |
| 2012/0323846 A1 | 12/2012 | Bai | |
| 2013/0066889 A1 | 3/2013 | Rodriguez | |
| 2013/0094751 A1 | 4/2013 | Nepomniachtchi | |
| 2013/0110670 A1* | 5/2013 | Webber | G06Q 30/06 |
| | | | 705/26.8 |
| 2013/0232071 A1 | 9/2013 | Dilip | |
| 2013/0246172 A1 | 9/2013 | Moissinac | |
| 2013/0311532 A1 | 11/2013 | Olsen | |
| 2013/0317895 A1 | 11/2013 | Turner | |
| 2013/0331130 A1 | 12/2013 | Lee | |
| 2014/0037184 A1 | 2/2014 | Gorski | |
| 2014/0052636 A1 | 2/2014 | Mattes | |
| 2014/0156512 A1 | 6/2014 | Rahman | |
| 2014/0162698 A1 | 6/2014 | Han | |
| 2014/0164109 A1 | 6/2014 | Chow | |
| 2014/0173755 A1* | 6/2014 | Wahl | G06F 21/6218 |
| | | | 726/28 |
| 2014/0236801 A1 | 8/2014 | Hansen | |
| 2014/0279525 A1 | 9/2014 | Mohsenzadeh | |
| 2014/0280910 A1 | 9/2014 | Swig | |
| 2014/0306896 A1 | 10/2014 | Sosby | |
| 2014/0310133 A1* | 10/2014 | Bednar | G06Q 30/0637 |
| | | | 705/26.82 |
| 2014/0310171 A1 | 10/2014 | Grossman | |
| 2015/0066679 A1 | 3/2015 | Mack | |
| 2015/0186989 A1 | 7/2015 | Kneen | |
| 2015/0220876 A1 | 8/2015 | Sethi | |
| 2015/0235477 A1 | 8/2015 | Simkin | |
| 2015/0356288 A1 | 12/2015 | Guo | |
| 2015/0379460 A1 | 12/2015 | Zamer | |
| 2015/0381629 A1* | 12/2015 | O'Sullivan | H04L 63/101 |
| | | | 726/4 |
| 2016/0004857 A1* | 1/2016 | Chen | G06F 21/40 |
| | | | 726/3 |
| 2016/0012503 A1 | 1/2016 | Fu | |
| 2016/0077734 A1 | 3/2016 | Buxton | |
| 2017/0270598 A1 | 9/2017 | Ram | |

FOREIGN PATENT DOCUMENTS

| | | |
|---|---|---|
| EP | 0992949 | 4/2000 |
| EP | 1067471 | 1/2001 |
| JP | 10240690 | 9/1998 |
| JP | 2000082101 | 3/2000 |
| JP | 2001297283 | 10/2001 |
| JP | 2003271851 | 9/2003 |
| JP | 2006259854 | 9/2006 |
| JP | 2007087081 | 4/2007 |
| JP | 2008532112 | 8/2008 |
| JP | 2009020676 | 1/2009 |
| JP | 2010066886 | 3/2010 |
| JP | 2012168616 | 9/2012 |
| JP | 201441614 | 6/2014 |
| JP | 2014515149 | 6/2014 |
| KR | 1020020057906 | 7/2002 |
| KR | 1020070034296 | 3/2007 |
| WO | 2012045128 | 4/2012 |
| WO | 2013003372 | 1/2013 |
| WO | 2013149883 | 10/2013 |
| WO | 2017080768 | 5/2017 |

* cited by examiner

METHOD AND SYSTEM FOR INFORMATION AUTHENTICATION

RELATED APPLICATION

Under 35 U.S.C. 119, this application claims the benefit and right of priority of Chinese Patent Application No. 201410315285.8, filed 3 Jul. 2014.

BACKGROUND

Field

The present application relates to the field of computer technologies, and in particular, to a method and system for information authentication.

Related Art

With the constant advancement of the computer and network technologies, it is common that users perform various operations via online accounts. For example, users may shop on e-commerce websites via accounts registered on these e-commerce websites.

However, along with the development of the computer and network technologies also comes an increasing amount of identity theft by unauthorized users. Once the account and password of a user are compromised, a malicious user may perform operations via the intercepted account, thereby causing great loss to the legitimate user.

Although a number of methods are available for increasing the difficulty in identity theft, the risk of such identity theft still remains.

SUMMARY

One embodiment of the present invention provides a system for facilitating multi-party authentication. During operation, the system receives, via a communication module, an operation request from a primary user. The system then sends an authentication request to the authentication assistance user and receives a response from the authentication assistance user. Subsequently, the system allows or denies the operation request based on the response received from the authentication assistance user.

In a variation of this embodiment, prior to sending the authentication request, the system determines whether authentication from at least one authentication assistance user is required to allow the operation request.

In a variation of this embodiment, while determining whether authentication from at least one authentication assistance user is required, the system applies at least one predetermined rule to the received operation request.

In a further variation, the rule is based on a transaction type associated with the operation request.

In a further variation, the rule is based on a payment amount.

In a variation of this embodiment, the system further determines whether the response received from the at least one authentication assistance user indicates an approval metric that is greater than a predetermined threshold.

In a variation of this embodiment, while sending the authentication request to the authentication assistance user, the system sends the authentication assistance user a text message based on a phone number, an email, or an instant message.

In a variation of this embodiment, while denying the operation request, the system sends a reason for denial to the primary user.

BRIEF DESCRIPTION OF THE FIGURES

The accompanying drawings herein, which are incorporated herein and constitute a part of the specification, illustrate several exemplary embodiments of the present application and together with the description, serve to illustrate the present application, construing no limitation to the present application. In the drawings.

DETAILED DESCRIPTION

Embodiments of the present invention solve the problem of improving the security of online transaction by allowing multiple parties, instead of a single party, to participate in an authentication process for the online transaction. Conventionally, an online transaction is allowed to proceed as long as a user enters a correct password or other types of user credentials of the corresponding online account. If the account name and password of the user are stolen, significant loss can occur. In addition, it is often the case that a single user is not the sole party in making the decision about an online transaction. For example, a minor might need both parents' approval before making a large online purchase. In a corporate environment, a decision or online transaction might require multiple parties' approval to consummate.

In embodiments of the present invention, one or more authentication assistance users are allowed to be associated with the authentication process for an account. For instance, in addition to a primary user entering the correct password for the account, confirmation from a number of authentication assistance users can also be required to perform an online transaction associated with the account. In this way, even if the primary user's account information and password are stolen, losses may be effectively prevented because the online transaction may not be allowed to proceed without confirmation from other authentication assistance users.

To make the objectives, technical solutions, and advantages of the present application clearer, the technical solutions of the present application are hereinafter described in detail thoroughly with reference to the specific embodiments of the present application and the corresponding drawings. Clearly, the embodiments described herein are merely exemplary ones, but are not all the embodiments of the present application. Based on the embodiments of the present application, all other embodiments derived by persons of ordinary skill in the art without any creative efforts shall fall within the protection scope of the present application.

Figure 1A:
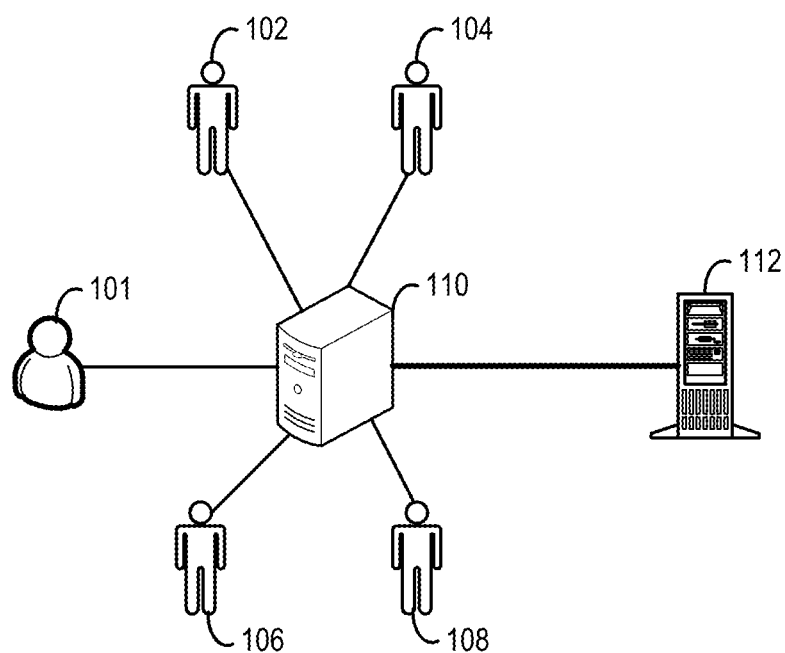
FIG. 1A illustrates an exemplary computing system that facilitates a multi-party authentication process, in accordance with an embodiment of the present application.

FIG. 1A illustrates an exemplary computing system that facilitates a multi-party authentication process, in accordance with an embodiment of the present application. In this example, an authentication server 110 is in communication with a primary user 101. Also coupled to authentication server 110 are authentication assistance users 102, 104, 106, and 108. A transaction server 112 (for example, an electronic-commerce merchant's datacenter) can be in communication with authentication server 110.

During operation, primary user 101 initiates a transaction request and sends the request to authentication server 110. Upon receiving this request, authentication server 110 sends an authentication request to assistance users 102, 104, 106, and 108. Each of these four assistance users can either approve or confirm the authentication request (for example, by providing their own authentication credentials such as a username and password), or deny the authentication request.

Once authentication server 110 receives approval or denial from the four assistance users 102, 104, 106, and 108, authentication server 110 can either allow the transaction requested by primary user 101 to proceed, or deny the transaction request from primary user 101. In one embodiment, when the transaction is approved to proceed, authentication server 110 can forward the transaction request to transaction server 112, which in turn processes the transaction request and consummates the corresponding transaction.

Note that assistance users 102, 104, 106, and 108 can be pre-determined by primary user 101 and be associated with primary user 101's account. Optionally, these assistance users can also be specified by an entity other than primary user 101. For example, in a corporate environment, primary user 101 can be an employee responsible for purchasing office equipment. For certain type of purchases, assistance users 102, 104, 106, and 108 can be managers from different departments, and approval from all these four assistance users is needed for a purchase order to go through.

It is also possible for authentication server 110 to implement a set of rules, such that certain transactions requested by primary user 101 can be approved by authentication server 110 without additional approval from any assistance user, while transactions that satisfy the rules would require additional approval from assistance users to proceed. For example, primary user 101 could be a college student, who uses a credit card provided by his parents to pay for living expenses. Authentication server 110 can be part of the credit card company's services. Authentication server 110 can store a set of rules that require certain types of transactions requested by primary user 101 to be approved by additional assistance users. For instance, a rule might specify that certain type of transactions under a given amount, such as payment for food or gas that is less than $100, can be processed without additional approval. Other types of payment, for example, a payment for electronic equipment, a payment for entertainment, or a payment that exceeds a predetermined limit, will require additional approval from the student's parents to be processed.

Note that the communication between authentication server 110 and a respective assistance user can be of any form. For example, authentication server 110 can send an email, a text message, or initiate a voice call to assistance user 102 to obtain the approval.

Figure 1B:
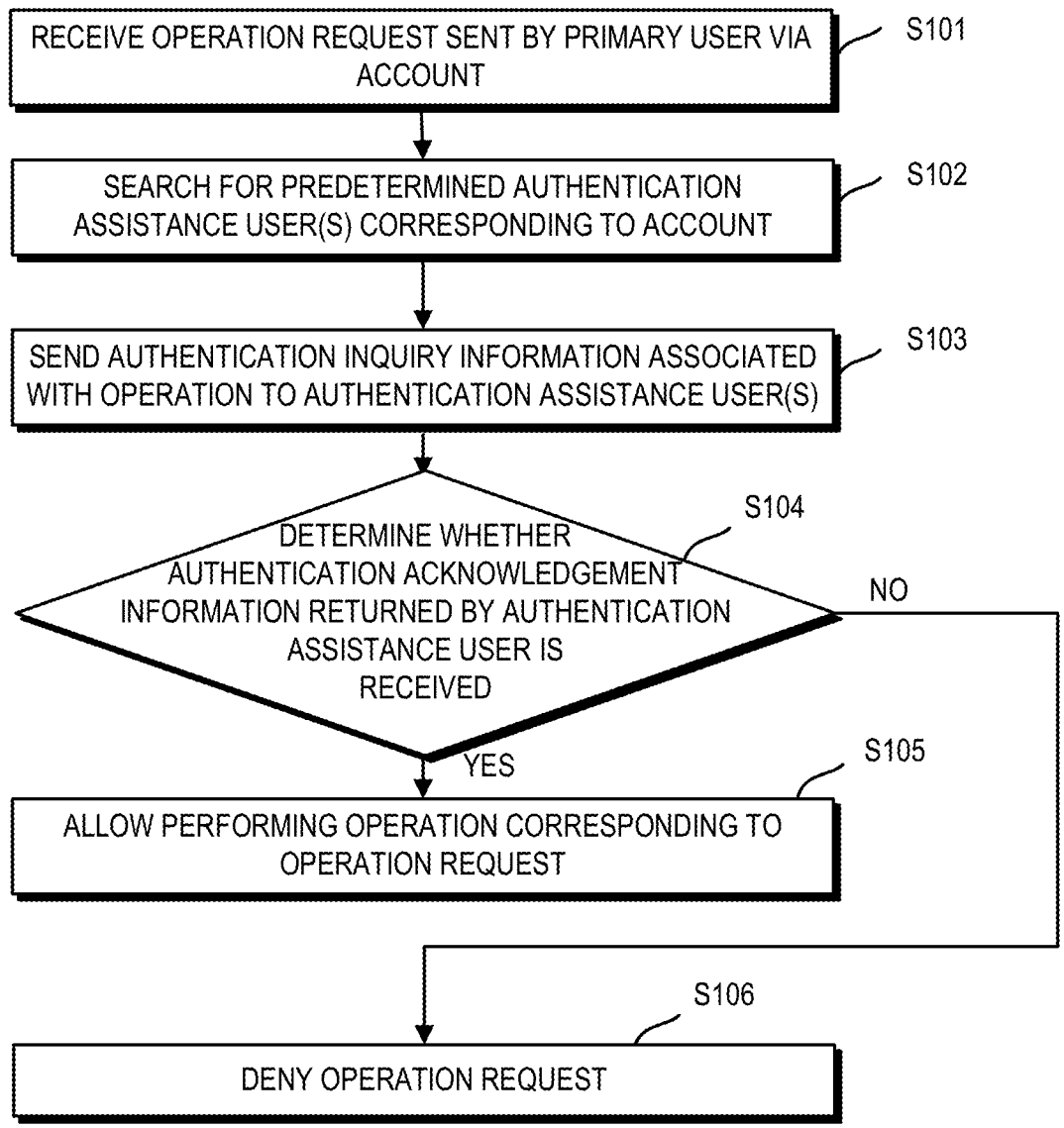
FIG. 1B illustrates a process of information authentication, in accordance with an embodiment of the present application.

FIG. 1B illustrates a process of information authentication in accordance with an embodiment of the present application. During operation, the authentication server receives an operation request that is sent by a primary user via an account that belongs to the primary user (operation S101). Note that when the primary user desires to perform an operation or transaction via the account, the primary user firstly needs to send an operation request to the authentication server. The operation request can include, but is not limited to, a payment request. Furthermore, the primary user is not necessarily the owner of the account. Since the operation request only carries account information, the authentication server may optionally choose not to determine whether the primary user is the owner of the account.

For example, when the primary user shops on an e-commerce website, the primary user may purchase a piece of merchandise via an account A registered on the e-commerce website, and the primary user may send a payment request to an authentication server of the e-commerce website via the account A (the payment request is the operation request), wherein since the payment request only carries information of the account A, in this case, the authentication server may choose not to determine whether the primary user is the owner of the account A.

Subsequently, the authentication server searches for a predetermined authentication assistance user corresponding to the account (operation S102). The authentication assistance user corresponding to the account may be predetermined by the owner of the account. Upon receiving the operation request sent by the primary user via the account, the authentication server may authenticate the password of the account entered by the primary user. If the password based authentication is successful, the authentication server may search for the authentication assistance user that is predetermined for the account by the owner of the account and contact information of the authentication assistance user. If the password based authentication fails, the server may directly deny performing the operation corresponding to the operation request without contacting any authentication assistance user.

The contact information of the authentication assistance user can include, but is not limited to: a mobile phone number, instant messaging account information, email address, an account on the same authentication server, or any form of user identifier in a secure messaging system of the authentication assistance user.

Still using the above example, with respect to the account A, the owner of the account A may predetermine a user u as a corresponding authentication assistance user, and store the contact information of user u on the authentication server. When receiving the payment request that is sent by the primary user via the account A, the authentication server first authenticates the password of account A; if the authentication is successful, the server may search for the contact information of authentication assistance user u corresponding to account A; and if the authentication fails, the server may directly deny the operation request.

Next, the authentication server sends authentication inquiry information with respect to the operation request to the identified authentication assistance user (operation S103). Upon identifying the authentication assistance user corresponding to the account and the contact information of the authenticated assistance user, the authentication server may send the authentication inquiry information with respect to the operation request to the authentication assistance user.

For example, when the contact information of the identified authentication assistance user is a mobile phone number, the authentication server may send the authentication inquiry information with respect to the operation request to the identified authentication assistance user via a text message. When the contact information of the authentication assistance user is an instant messaging account, the authentication server may send the authentication inquiry information with respect to the operation request to the assistance user's instant messaging account.

Furthermore, using the same example described above, the server may send information of the merchandise ordered by the primary user indicated in the payment request, the payment amount requested, time information of the payment request, and the like to assistance user u via a text or instant message, to inquire whether assistance user u acknowledges the payment by the primary user. For example, the authentication server may send a short message "Account A is purchasing merchandise s at time hh:mm, and is now requesting payment of x; reply with Y to confirm, or reply with N to deny" to the mobile phone number of user u.

If the contact information of the authentication assistance user is an instant messaging account or an email address, the above authentication inquiry information may also be sent to the corresponding instant messaging account or email address. If the contact information of the assistance user is an account on the authentication server, upon determining that the authentication assistance user has logged into the system via the account, the authentication server may also push the authentication inquiry information to the authentication assistance user via a message, a link to a webpage, or an alert.

The authentication server then determines whether authentication acknowledgement information returned by the authentication assistance user is received (operation S105). If the authentication acknowledgement information is not received, or if the assistance user returns a disapproval or denial, the authentication server denies the operation request (operation S106). If no information is received from the authentication assistance user within a predetermined time duration (for example, 5 minutes), the server may consider that the authentication assistance user has denied the operation request.

If the authentication server receives authentication acknowledgement information returned by the authentication assistance user, the authentication server can allow performing the operation corresponding to the operation request (operation S105). If no information is received from the authentication assistance user within a predetermined time duration (for example, 5 minutes), the server may consider that the authentication assistance user denies the operation request, that is, the server considers that the authentication assistance user has returned authentication deny information and thus furthers relevant processing.

Still using the above example, upon sending the short message "Account A is purchasing merchandise s at time hh:mm, and is now requesting payment of x; reply with Y to confirm, or reply with N to deny" to the mobile phone number of the authentication assistance user u associated with account A, the authentication server may monitor the content of the short message returned by user u. If a short message with content "Y" is received from user u, the authentication server determines that authentication acknowledgement information returned by user u is received, and thus allows performing the operation corresponding to the payment request sent by the primary user (that is, allows the primary user to pay x to purchase merchandise s via account A); and if a short message with content "N" is received from the user u, the authentication server determines that user u has denied the authentication request, and thus denies performing the operation corresponding to the payment request sent by the primary user.

According to the above method, although the server may choose not to determine whether the primary user is the owner of the account, and the operation request may be allowed only when the authentication assistance user of the account acknowledges the operation request. Therefore, when the account and password of a user are intercepted, that is, when the primary user sending the operation request is not the owner of the account, even if an unauthorized user enters the correct password, the unauthorized user still cannot perform any operation via the account without the approval of the authentication assistance users. In this way, even if the account and password of the user are stolen, it may still be ensured that the owner of the account is not subjected to any loss.

In addition, embodiments of the present invention can provide protection for underage users of the Internet. For example, a child's guardians can be set as the authentication assistance users of the accounts, and the operations to be performed by the child over the Internet may be allowed to perform only when the guardians acknowledge and allow the operations.

In general, the authentication server can implement rules to determine whether a received operation request would require additional approval from authentication assistance user(s). For example, in operation S101 as illustrated in FIG. 1B, when the operation request sent by the primary user via the account is a payment request, before the authentication server searches for the predetermined authentication assistance user corresponding to the account in operation S102, the server may determine whether the payment amount requested by the operation request is greater than a predetermined threshold. If the amount is greater than the threshold, the server determines that additional approval from authentication assistance user(s) is needed, and searches for the authentication assistance user corresponding to the account. Otherwise, the server may directly allow performing the operation corresponding to the operation request without requiring additional approval from the assistance user(s). The predetermined amount may be otherwise defined according to actual needs, or may be defined by the owner of the account, for example, $500.

Similarly, before the server searches for the predetermined authentication assistance user corresponding to the account, the server may also determine that the type of the received operation request is a predetermined operation request type. If the type of the received operation request is a predetermined operation request type, the server searches for the predetermined authentication assistance user corresponding to the account, to inquire whether the authentication assistance user acknowledges the operation request. Otherwise, the server may directly allow performing the operation corresponding to the operation request. The predetermined type of operation request may be a payment request, a user information change request, or the like. For instance, the authentication server may require additional approval from authentication assistance users only when the operation request sent by the primary user is a payment request or a user information change request. With respect to other types of operation requests (for example, a login request, a commodity inquiry request, or the like), the operation may be directly allowed.

As such, if the authentication server determines, based on predetermined rules or thresholds, not to require additional approval from authentication assistance user(s), the authentication server may allow performing the operation corresponding to the operation request after the primary user enters the correct password. Furthermore, the server may send a predetermined security question corresponding to the account to the primary user, and may allow performing the operation only after the primary user correctly answers the security question.

In some embodiments, the owner of the account may predefine a plurality of authentication assistance users for the account, and only a subset of approvals from all the authentication assistance users is needed to approve the operation request. For example, the authentication server may identify the authentication assistance users corresponding to the account, and send authentication inquiry information to these assistance users. The authentication server can then determine whether a ratio of the number of authentication assistance users returning authentication acknowledgement information to the number of total authentication assistance users is greater than a predetermined threshold. If the ratio is greater than the threshold, the server allows the operation request. Otherwise, the server denies the operation request. The predetermined threshold may be defined according to actual needs, or may be defined by the owner of the account.

For example, with respect to the account A, assume that the owner of the account A predefines n authentication assistance users, then according to the criterion that the operation is not allowed to perform as long as one authentication assistance user denies performing the operation, the predetermined threshold (which is the absolute number of assistance users giving approval) may be defined to be n−1. As such, the authentication server only allows the operation request when all the authentication assistance users returns approval for the request.

In a further example, if the system adopts a majority principle, i.e., as long as there are more assistance users giving approval than assistance users denying the request, then a ratio of 50% can be used. That is, as long as the ratio of approving assistance users to the total assistance users is greater than 50%, the authentication server can allow the operation request. Other ways of setting the threshold for allowing the operation request are also possible.

In a further embodiment, the authentication system can allow an assistance user to provide a reason for denying the authentication request. For example, the deny reason returned by an assistance user can be that "the account has been compromised, and the operation is not performed by the authorized user." The authentication server may further present the denial reason to the primary user upon denying the operation request.

Figure 2:
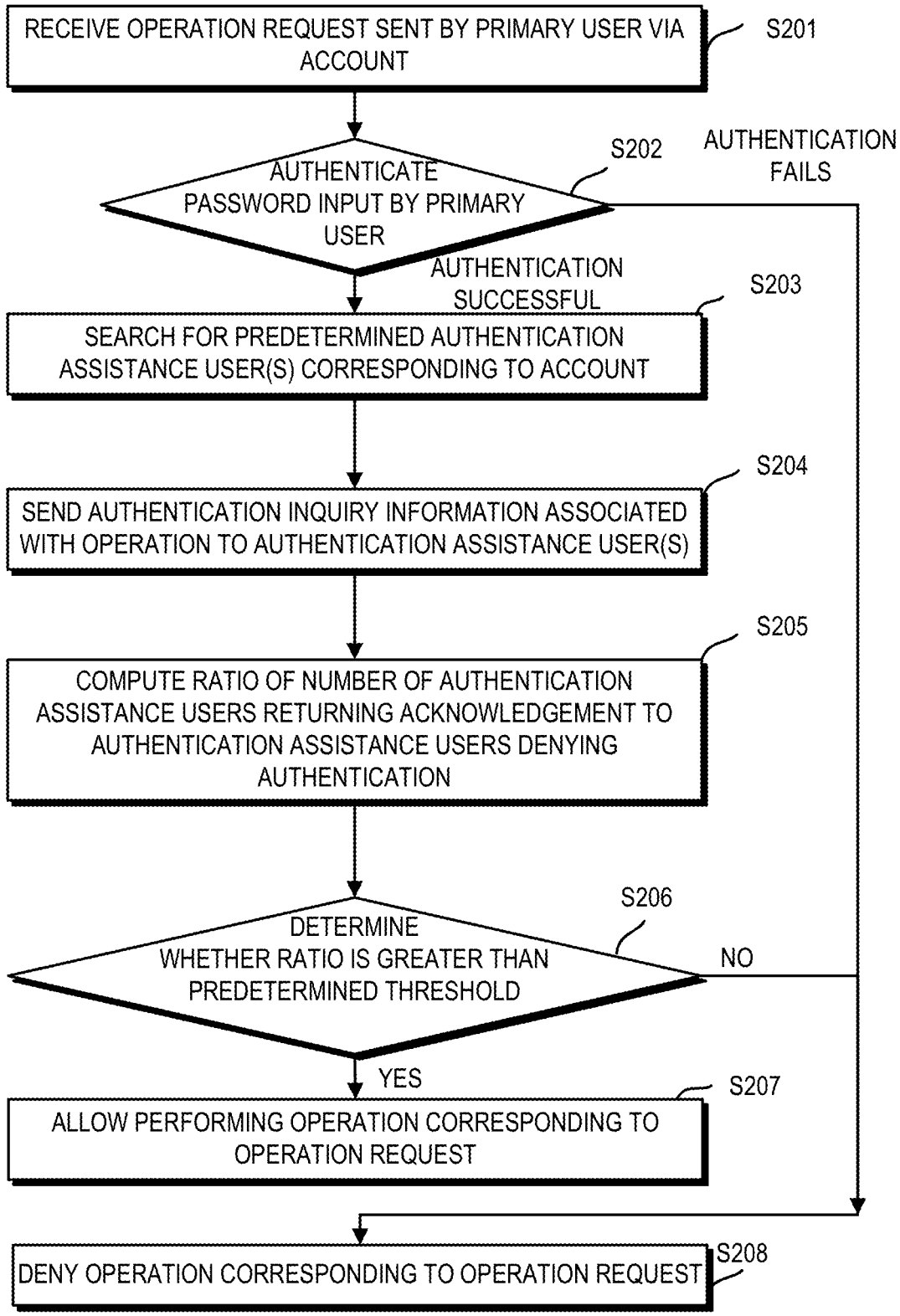
FIG. 2 illustrates a detailed process of information authentication according to an embodiment of the present application.

FIG. 2 illustrates a detailed process of information authentication, according to an embodiment of the present application. During operation, the authentication server receives an operation request sent by a primary user via an account (operation S201). The authentication server then authenticates a password provided by the primary user (operation S202). If the password-based authentication fails, the authentication server denies the operation corresponding to the operation request (operation S208).

If the primary user's password based authentication is successful, the authentication server proceeds to search for predetermined authentication assistance user corresponding to the account through which the primary user has sent the operation request (operation S203). The authentication server then sends authentication inquiry information associated with the operation to the identified authentication assistance user(s) (operation S204).

Next, the authentication server computes the ratio of the authentication assistance users returning acknowledgement (i.e., approval) to the authentication assistance users denying authentication (operation S205). Note that in this example, the threshold is based on such a ratio as described above. Other formula, such as a percentage of the authentication users giving approval, or an absolute number of approving assistance users, can also be used.

The authentication server then determines whether the ratio is greater than a predetermined threshold (operation S206). If so, the authentication server allows performing the operation corresponding to the operation request (operation S207). Otherwise, the authentication server denies the operation (operation S208).

After performing an operation corresponding to the operation request is denied, denial reason information in the authentication denial information may be presented to the primary user.

Figure 3:
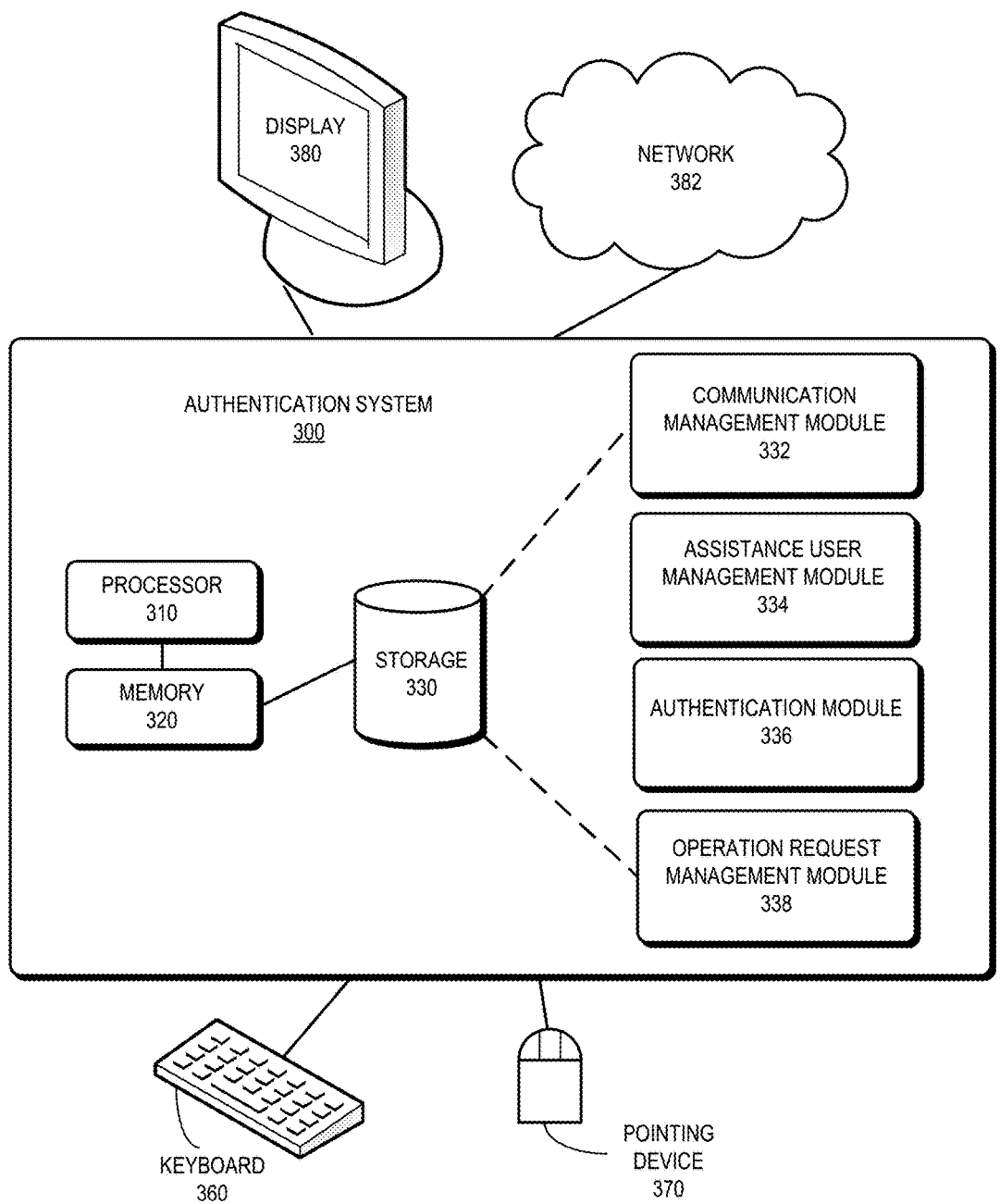
FIG. 3 illustrates an exemplary authentication system that facilitates multi-party authentication, in accordance with an embodiment of the present invention.

FIG. 3 illustrates an exemplary authentication system that facilitates multi-party authentication, in accordance with an embodiment of the present invention. An authentication system 300 includes a processor 310, a memory 320, and a storage device 330. Storage 330 typically stores instructions that can be loaded into memory 320 and executed by processor 310 to perform the methods described above. In one embodiment, the instructions in storage 330 can implement a communication management module 332, an assistance user management module 334, an authentication module 336, and an operation request management module 338, all of which can communicate with each other through various means.

In some embodiments, modules 332, 334, 336, and 338 can be partially or entirely implemented in hardware and can be part of processor 310. Further, in some embodiments, the system may not include a separate processor and memory. Instead, in addition to performing their specific tasks, modules 332, 334, 336, and 338, either separately or in concert, may be part of special-purpose computation engines.

Storage 330 stores programs to be executed by processor 310. Specifically, storage 330 stores a program that implements a system (application) for enabling multi-party authentication. During operation, the application program can be loaded from storage 330 into memory 320 and executed by processor 310. As a result, system 300 can perform the functions described above. System 300 can be further coupled to an optional display 380, a keyboard 360, and a pointing device 370, and can be coupled via one or more network interfaces to a network 382.

During operation, communication management module 332 receives an operation request from a primary user via, for example, a communication port on system 300 (such as a network interface card). Upon authenticating the primary user with his individual credentials, assistance user management module 334 identifies one or more assistance users associated with the account via which the primary user sends the operation request. Subsequently, authentication module 336 sends authentication inquiries to the identified assistance users, and receives the corresponding responses. Based on the responses received from the assistance users, authentication module 336 determines whether a sufficient number of authentication acknowledgements (approvals) have been received. Accordingly, operation request management module 338 determines whether to allow or deny the operation request.

In some embodiments, assistance user management module 334 can determine whether assistance user approval is necessary based on certain rules applied to the operation request (such as a payment amount threshold or the type of online transaction corresponding to the operation request). In addition, authentication module 336 can apply a predetermined threshold for received approvals from the assistance users.

The data structures and computer instructions described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. An computer-implemented method for facilitating multi-party authentication, the method comprising:
   receiving, via a communication module, a first request from a primary user to associate a plurality of authentication assistance users with an account of the primary user;
   storing, in a storage device, data associating the account of the primary user with the authentication assistance users;
   receiving, via the communication module, a second request from the primary user to perform an operation, wherein the second request is received subsequent to storing the data associating the account of the primary user with the authentication assistance users;
   determining, by a processor, a type of the operation in the second request;
   in response to determining that the type is a first predetermined type of operation which requires approval from the authentication assistance users:
      sending an authentication request to each of the authentication assistance users;
      in response to receiving an approval response from a first subset of the authentication assistance users, wherein the first subset is a first percentage which is less than an entirety of the authentication assistance users and greater than a predetermined threshold, allowing the second request;
      in response to detecting a lack of response from a first authentication assistance user within a predetermined period of time, counting the lack of response as receiving a denial response; and
      in response to receiving a denial response from a second subset of the authentication assistance users, wherein the second subset is a second percentage which is less than the entirety of the authentication assistance users and less than or equal to the predetermined threshold, denying the second request,
      wherein prior to receiving the denial response from the second subset, the method further comprises:
         receiving, by at least one second authentication assistance user of the second subset, the authentication request;
         in response to the authentication request, providing, by the at least one second authentication assistance user, a reason for the denial; and
         receiving, by the communication module, the reason for the denial provided by the at least one second authentication assistance user, and
      wherein subsequent to receiving the denial response from the second subset, the method further comprises:
         displaying, on a device associated with the primary user, the reason for the denial provided by the at least one second authentication assistance user.

2. The method of claim 1, further comprising:
   in response to determining that the type is not the first predetermined type of operation, allowing the second request.

3. The method of claim 2, wherein determining whether the type is the first predetermined type of operation further comprises:
   applying at least one predetermined rule to the received second request.

4. The method of claim 3, wherein the predetermined rule is based on a payment amount.

5. The method of claim 1, wherein in response to sending the authentication request to each of the authentication assistance users, the method further comprises:
   receiving responses from each of the authentication assistance users;
   determining a first number of received approval responses; and
   allowing or denying the request based on whether a ratio of the first number to a total number of the authentication assistance users is greater than the predetermined threshold.

6. The method of claim 1, wherein sending the authentication request to a respective authentication assistance user comprises sending the respective authentication assistance user a text message based on a phone number, an email, or an instant message.

7. The method of claim 1, wherein denying the second request comprises sending a reason for denial to the primary user.

8. A non-transitory storage medium storing instructions, which when executed by a processor cause the processor to perform a method for facilitating multi-party authentication, the method comprising:
   receiving, via a communication module, a first request from a primary user to associate a plurality of authentication assistance users with an account of the primary user;
   storing, in a storage device, data associating the account of the primary user with the authentication assistance users;
   receiving, via the communication module, a second request from the primary user to perform an operation, wherein the second request is received subsequent to storing the data associating the account of the primary user with the authentication assistance users;

determining, by the processor, a type of the operation in the second request;

in response to determining that the type is a first predetermined type of operation which requires approval from the authentication assistance users:

sending an authentication request to each of the authentication assistance users;

in response to receiving an approval response from a first subset of the authentication assistance users, wherein the first subset is a first percentage which is less than an entirety of the authentication assistance users and greater than a predetermined threshold, allowing the second request;

in response to detecting a lack of response from a first authentication assistance user within a predetermined period of time, counting the lack of response as receiving a denial response; and in response to receiving a denial response from a second subset of the authentication assistance users, wherein the second subset is a second percentage which is less than the entirety of the authentication assistance users and less than or equal to the predetermined threshold, denying the second request, wherein prior to receiving the denial response from the second subset, the method further comprises:

receiving, by at least one second authentication assistance user of the second subset, the authentication request;

in response to the authentication request, providing, by the at least one second authentication assistance user, a reason for the denial; and receiving, by the communication module, the reason for the denial provided by the at least one second authentication assistance user, and wherein subsequent to receiving the denial response from the second subset, the method further comprises:

displaying, on a device associated with the primary user, the reason for the denial provided by the at least one second authentication assistance user.

9. The non-transitory storage medium of claim 8, wherein the method further comprises:

in response to determining that the type is not the first predetermined type of operation, allowing the second request.

10. The non-transitory storage medium of claim 9, wherein determining whether the type is the first predetermined type of operation further comprises:

applying at least one predetermined rule to the received second request.

11. The non-transitory storage medium of claim 8, wherein in response to sending the authentication request to each of the authentication assistance users, the method further comprises:

receiving responses from each of the authentication assistance users;

determining a first number of received approval responses; and allowing or denying the request based on whether a ratio of the first number to a total number of the authentication assistance users is greater than the predetermined threshold.

12. The non-transitory storage medium of claim 8, wherein denying the second request comprises sending a reason for denial to the primary user.

13. A computer system for facilitating multi-party authentication, the computer system comprising:

a processor;

a memory coupled to the processor and storing instructions, which when executed by the processor cause the processor to perform a method, the method comprising:

receiving, via a communication module, a first request from a primary user to associate a plurality of authentication assistance users with an account of the primary user;

storing, in a storage device, data associating the account of the primary user with the authentication assistance users;

receiving, via the communication module, a second request from the primary user to perform an operation, wherein the second request is received subsequent to storing the data associating the account of the primary user with the authentication assistance users;

determining, by the processor, a type of the operation in the second request;

in response to determining that the type is a first predetermined type of operation which requires approval from the authentication assistance users:

sending an authentication request to each of the authentication assistance users;

in response to receiving an approval response from a first subset of the authentication assistance users, wherein the first subset is a first percentage which is less than an entirety of the authentication assistance users and greater than a predetermined threshold, allowing the second request;

in response to detecting a lack of response from a first authentication assistance user within a predetermined period of time, counting the lack of response as receiving a denial response; and in response to receiving a denial response from a second subset of the authentication assistance users, wherein the second subset is a second percentage which is less than the entirety of the authentication assistance users and less than or equal to the predetermined threshold, denying the second request, wherein prior to receiving the denial response from the second subset, the method further comprises:

receiving, by at least one second authentication assistance user of the second subset, the authentication request;

in response to the authentication request, providing, by the at least one second authentication assistance user, a reason for the denial; and receiving, by the communication module, the reason for the denial provided by the at least one second authentication assistance user, and wherein subsequent to receiving the denial response from the second subset, the method further comprises:

displaying, on a device associated with the primary user, the reason for the denial provided by the at least one second authentication assistance user.

14. The computer system of claim 13, wherein the method further comprises:

in response to determining that the type is not the first predetermined type of operation, allowing the second request.

15. The computer system of claim 14, wherein determining whether the type is the first predetermined type of operation further comprises:

applying at least one predetermined rule to the received second request.

16. The computer system of claim 13, wherein in response to sending the authentication request to each of the authentication assistance users, the method further comprises:
receiving responses from each of the authentication assistance users;
determining a first number of received approval responses; and
allowing or denying the request based on whether a ratio of the first number to a total number of the authentication assistance users is greater than the predetermined threshold.

17. The computer system of claim 13, wherein sending the authentication request to a respective authentication assistance user comprises sending the respective authentication assistance user a text message based on a phone number, an email, or an instant message.

18. The computer system of claim 13, wherein denying the second request comprises sending a reason for denial to the primary user.

19. The method of claim 1, wherein sending the authentication request further comprises searching for a respective authentication assistance user associated with the account through which the primary user sends the second request.

20. The method of claim 1, further comprising:
receiving a threshold-defining request from the primary user to specify a predetermined threshold of authentication assistance users required to approve a type of operation requested by the primary user.

21. The method of claim 1, further comprising:
receiving a third request from a user to perform a new operation, wherein the user is not an owner of the account;
determining, based on conditions specified by the owner of the account, that the new operation requires approval from a respective authentication assistance user;
receiving a second response from the respective authentication assistance user; and
denying the third request based on the second response received from the respective authentication assistance user.

22. The method of claim 1, wherein allowing or denying the second request further comprises:
sending a security question associated with the account to the primary user; and
allowing the second request in response to receiving a correct answer to the security question from the primary user.

* * * * *